United States Patent
Gangwal et al.

(10) Patent No.: US 6,962,683 B2
(45) Date of Patent: Nov. 8, 2005

(54) METHOD OF REMOVING AND RECOVERING ELEMENTAL SULFUR FROM HIGHLY REDUCING GAS STREAMS CONTAINING SULFUR GASES

(75) Inventors: Santosh K. Gangwal, Cary, NC (US); Apostolos A. Nikolopoulos, Durham, NC (US); Thomas P. Dorchak, deceased, late of Morgantown, WV (US); by Mary Anne Dorchak, legal representative, Morgantown, WV (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 10/194,221

(22) Filed: Jul. 15, 2002

(65) Prior Publication Data

US 2004/0013590 A1 Jan. 22, 2004

(51) Int. Cl.⁷ .......................... C01B 17/02; C01B 17/04
(52) U.S. Cl. ............... 423/573.1; 423/244.02; 423/244.09; 423/244.1; 423/574.1; 423/574.2; 423/576
(58) Field of Search ................ 423/574.1, 574.2, 423/573.1, 576, 244.01, 244.1, 244.02, 244.09

(56) References Cited

U.S. PATENT DOCUMENTS

| | | |
|---|---|---|
| 2,031,802 A | 2/1936 | Tyrer |
| 2,368,595 A | 1/1945 | Johnson |
| 2,563,437 A | 8/1951 | Townend et al. |
| 2,580,068 A * | 12/1951 | Beekley .................. 423/244.1 |
| 2,729,543 A | 1/1956 | Keller |
| 2,971,824 A | 2/1961 | Johnson et al. |
| 3,911,093 A | 10/1975 | Sherif et al. |
| 4,092,404 A | 5/1978 | Hass |
| 4,107,269 A | 8/1978 | Rossarie et al. |
| 4,171,347 A | 10/1979 | Hass |
| 4,968,502 A | 11/1990 | Radel |
| 5,254,516 A | 10/1993 | Gupta et al. |
| 5,366,717 A | 11/1994 | Dorchak et al. |
| H1538 H * | 6/1996 | Harryman .................. 252/373 |
| 5,714,431 A | 2/1998 | Gupta et al. |
| 5,798,088 A | 8/1998 | Dorchak et al. |
| 5,928,980 A | 7/1999 | Gangwal et al. |
| 6,485,633 B2 | 11/2002 | Wismann et al. |
| 6,565,741 B2 | 5/2003 | Wismann et al. |
| 6,682,711 B2 * | 1/2004 | Motal et al. ........... 423/244.09 |
| 2003/0129123 A1 * | 7/2003 | Ramani .................. 423/573.1 |
| 2003/0194366 A1 * | 10/2003 | Srinivas et al. |

FOREIGN PATENT DOCUMENTS

GB    14378143    *    5/1976    .............. 423/574.1

OTHER PUBLICATIONS

Kohl et al. *Gas Purification* 4th Ed., Gulf Publishing Company Houston TX USA, ISBN 0–87201–314–6, pp. 441, 735, 753 & 754 (1985).*

(Continued)

*Primary Examiner*—Wayne A. Langel
(74) *Attorney, Agent, or Firm*—Oblon, Spivak, McClelland, Maier & Neustadt, P.C.

(57) ABSTRACT

A method is provided for removal of sulfur gases and recovery of elemental sulfur from sulfur gas containing supply streams, such as syngas or coal gas, by contacting the supply stream with a catalyst, that is either an activated carbon or an oxide based catalyst, and an oxidant, such as sulfur dioxide, in a reaction medium such as molten sulfur, to convert the sulfur gases in the supply stream to elemental sulfur, and recovering the elemental sulfur by separation from the reaction medium.

89 Claims, 2 Drawing Sheets

OTHER PUBLICATIONS

Written Opinion PCT/US03/22016, Jul. 15, 2003.

E. Alvarez, et al., "Catalyst for the elimination of sulphur dioxide from streams by the Claus reaction at low temperature", Applied Catalysis A: General, 93 (1993). pp. 231–244, no month.

M. I. Guijarro, et al., "Deactivation by fouling of a new catalyst for the low temperature Claus process", Applied Catalysis A: General, 132 (1995), pp. 335–351, no month.

E. Alvarez, et al., "Sulphur recovery from sour gas by using a modified low–temperature Claus process on seplolite", Applied Catalysis B: Environmental, 9 (1996), pp. 179–199, no month.

M.J. Pearson, "Catalyst Performance in Low–Temperature Claus Process", Energy Process/Canada, Jul.–Aug., 1976, pp. 38–42.

U.S. Appl. No. 60/367,891, filed Mar. 25, 2002, Girish–Srinivas et al.

U.S. Appl. No. 60/388,322, filed Jun. 13, 2002, Girish–Srinivas et al.

U.S. Appl. No. 60/420,694, filed Oct. 22, 2002, Girish–Srinivas et al.

J.W. Smith, et al., "Dry Desulfurization of Industrial Process Gases by Low Temperature Catalytic Oxidation", McMaster Symposium on Iron and Steelmaking No. 5, pp. 14–1–14–7, no date.

J.W. Portzer, et al., "Durability Testing of the Direct Sulfur Recovery Process", no date.

"Advanced Sulfur Control Concepts of Hot Gas Desulfurization Technology", Quarterly Technical Progress Report, RTI Project No. 93U–5869, DOE Contract No. DE–AC21–94MC31258–21, Oct. 1, 1998—Dec. 31, 1998.

"Technical and Economic Comparison of Existing and Emerging Sulfur Recovery Technologies", 1993, no month.

"Advanced Coal–Based Power & Environmental Systems '98 Conference", NETL Publications, 1998 Conference Proceedings, no month.

J.J. Spivey, et al., "Candidate Processes and Materials for the Direct Oxidation of $H_2S$ in Coal Gas", no date.

A.L. Kohl, et al., "Gas Purification", $5^{th}$ Ed., pp. 40–186, 509, 591–593, and 602, no date.

* cited by examiner

METHOD OF REMOVING AND RECOVERING ELEMENTAL SULFUR FROM HIGHLY REDUCING GAS STREAMS CONTAINING SULFUR GASES

This application is made based on work supported by the U.S. Department of Energy under Contract No. DE-AC21-94MC31258. The U.S. Government may have certain rights in this invention.

BACKGROUND OF THE INVENTION

1. Field of Invention

The present invention relates to a method for the removal and recovery of elemental sulfur from gas streams that contain sulfur gases and are highly reducing due to the presence of large quantities of hydrogen and carbon monoxide.

2. Discussion of the Background

Gasification of heavy carbonaceous feeds (e.g. coal, petroleum coke, petroleum resids, biomass and others) produces a synthesis gas (syngas) containing greater than 30 volume percent and as much as 90 volume percent of reducing gases, hydrogen and carbon monoxide ($H_2$ and CO), depending on the different gasification processes employed such as KRW, Texaco, Shell etc. The sulfur bound to these feeds gasifies to hydrogen sulfide ($H_2S$) that remains in the syngas as a major contaminant upon gasification. $H_2S$ must be removed and disposed before the syngas can be further utilized to produce electricity in a gas turbine or liquid fuels and chemicals (for example using Fischer-Tropsch synthesis). Presently, removal of $H_2S$ involves a solvent-based process (e.g. using amine solutions). The amine-based process involves a number of steps and is highly equipment intensive. The raw syngas is first contacted with the amine solution using a gas-liquid scrubber. The spent amine is then regenerated using steam and the regeneration off-gas containing $H_2S$ is sent to a Claus plant. The Claus plant consists of an $H_2S$ burner, which oxidizes ⅓ of the $H_2S$ to $SO_2$. The $H_2S$—$SO_2$ mixture is then sent through a series of up to three catalytic reactor stages with inter-stage coolers to carry out the Claus reaction ($2H_2S + SO_2 = 2H_2O + \frac{3}{8}S_8$) and recover sulfur. The tail gas from the last reactor still contains about 2% of this inlet sulfur. It is sent to a tail gas treatment plant such as Shell-Claus Off-Gas Treating (SCOT) plant, which is as big as ½ the size of the Claus plant. As is seen, the solvent route to $H_2S$ removal is quite cumbersome.

Another class of solvent-based processes involves liquid-phase redox catalysis. In these processes (such as Stretford, Locat etc.), the $H_2S$ is reacted with a liquid-phase catalyst containing iron and/or vanadium chelates. The reacted catalyst is then oxidized in a separate reactor to directly produce elemental sulfur. Although this class of processes is attractive in that they avoid the use of a Claus plant, the elemental sulfur produced is contaminated with the catalyst constituents. These processes have generally been limited to small plants typically less than 2 tonnes/day sulfur and suffer from numerous mechanical and process chemistry problems.

Yet another class of solvent-based processes, the so called "liquid-Claus" processes involves the reaction of $H_2S$ and $SO_2$ in a liquid solvent (e.g., U.S. Pat. No. 4,107,269), such as metacresol, benzyl alcohol, 2-phenoxy ethanol, diethylene glycol, ethyl ether etc. with a soluble catalyst such as potassium benzoate. Again, these processes are attractive in that they avoid the use of a Claus plant. However, solvent losses would result and the sulfur would be contaminated with the solvent and/or catalyst. Consequently, the authors are not aware of any commercial installation employing this approach.

Alternative dry regenerable zinc-based sorbent processes are under development. In these processes the $H_2S$ is reacted with zinc oxide (ZnO) in an absorbing reactor at temperatures above 250° C. The spent sorbent is regenerated in a separate reactor using air to produce a dilute $SO_2$-containing off-gas. The $SO_2$ containing off-gas can be subjected to sulfur recovery using a number of alternate processes such as Wellman-Lord/Augmented Claus or Direct Sulfur Recovery Process (DSRP), which catalytically reduces the $SO_2$ to elemental sulfur (U.S. Pat. Nos. 5,366,717 and 5,798,088). These alternative process schemes are also quite complex utilizing three or more reactors.

In all commercial processes conceived to date, removal of $H_2S$ from the highly reducing raw syngas involves a first step to absorb or adsorb the sulfur gases using a liquid solvent, metal chelate solution or dry sorbent. Then another step is needed to free up this sulfur either as another gas stream containing sulfur that must be further extensively treated or as contaminated elemental sulfur that must be cleaned before disposal. These processes either involve highly equipment intensive Claus and off-gas treating plants or produce contaminated sulfur rather than Claus-quality (equivalent to sublimated-quality) sulfur.

Thus conventional and developmental methods for removing $H_2S$ and recovering elemental sulfur from highly reducing syngas streams are complex multistage processes. There is therefore a need for a simple, direct, and continuous process for removing sulfur gases and recovering Claus-quality elemental sulfur from highly reducing syngas streams containing 30 to 90 volume % reducing gas ($H_2$+CO) components.

SUMMARY OF THE INVENTION

Accordingly, one object of the present invention is to provide a process for the direct removal of sulfur gases from highly reducing syngas streams.

Another object of the present invention is to provide a process for the continuous and direct removal of sulfur gases from highly reducing syngas streams.

A further object of the present invention is to provide a process for the direct and/or continuous removal of sulfur gases and recovery of high purity elemental sulfur from highly reducing syngas streams.

A further object of the present invention is to provide a process for the simple, direct and continuous removal of sulfur gases and recovery of elemental sulfur from syngas streams containing from 30 to 90 volume % of reducing gas components (hydrogen and carbon monoxide).

These and other objects of the present invention have been satisfied by the discovery of a method for removal and recovery of sulfur from a sulfur gas containing supply stream, comprising:

contacting the supply stream containing sulfur gases and at least about 20 volume % of reducing components, with a catalyst selected from activated carbons and oxide catalysts, and sulfur dioxide in a reaction medium, at a temperature and pressure sufficient to cause oxidation of the sulfur gases to elemental sulfur; and recovering at least a portion of the elemental sulfur by separation of the elemental sulfur from the reaction medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention relates to a process for the removal of sulfur gases and recovery of high purity, Claus-grade elemental sulfur from gas mixtures that contain significant levels of reducing gases. The supply stream gas mixtures are preferably mixtures such as syngas, coke oven gas, refinery gas, natural gas, Claus tailgas, other sour gases, and other hydrocarbon based gas mixtures having significant detrimental levels of sulfur gases present. The reducing gases are most commonly hydrogen and carbon monoxide ($H_2$ and CO) and are preferably present in the syngas mixtures in amounts greater than about 20 volume %, more preferably amounts greater than about 30 volume %, still more preferably in amounts from 30 to 90 volume %.

Figure 1:
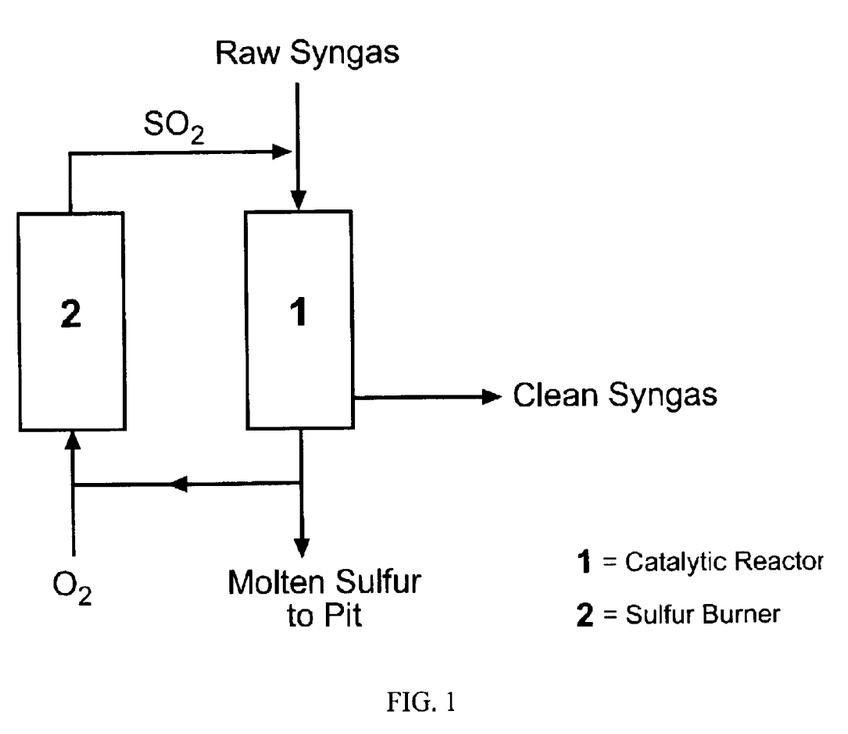
FIG. 1 shows a schematic representation of a process according to the present invention.

The process of the present invention is schematically shown in FIG. 1.

The supply stream, preferably raw syngas, is mixed with $SO_2$. The $H_2S$ reacts with $SO_2$ over an oxide catalyst, producing sulfur selectively without consumption of the reducing components ($H_2$ and CO) of the syngas. The sulfur is withdrawn from the catalytic reactor (1) to a sulfur pit. A third of the sulfur produced is burned in a sulfur burner (2) to produce the $SO_2$ for mixing with the raw syngas. Clean syngas substantially free of sulfur gases leaves the catalytic reactor. Within the context of the present invention, the term "substantially free of sulfur gases" is intended to mean that the syngas contains only amounts of sulfur gases that are insufficient to detrimentally affect the downstream turbine for power generation, preferably less than 200 ppmv, more preferably less than 100 ppmv sulfur gases. Further cleanup of the remaining sulfur gases in syngas down to less than 60 ppbv can be carried out, if the objective is liquid fuels and chemicals production rather than power generation, using a conventional zinc oxide guard bed.

While the catalytic reactor and sulfur burner can each be independently operated under a range of pressure conditions within the present process, it is preferred that the catalytic reactor and sulfur burner operate nearly at the same pressure as the syngas pressure (typically 300 to 1200 psig). The catalytic reactor preferably operates above the dew point of steam present in the syngas, with the temperature being selected to be above the sulfur solidification point at about 121° C. and below the point where molten sulfur undergoes a rapid increase in viscosity (above about 160° C.) making recovery from the catalyst difficult, and to minimize sulfur evaporation. The temperature of the catalytic reactor is most preferably from 125° C. to 158° C.

While not intending to be bound by the exact mechanism of the reactions occurring in the various reactors of the present process, it is believed that the reaction occurring in the catalytic reactor is the Claus reaction:

$$2H_2S + SO_2 \rightarrow \tfrac{3}{8}S_8 + 2H_2O$$

It would be expected that in the presence of highly reactive reducing components ($H_2$, CO), the predominant reaction would be the formation of more gaseous sulfur ($H_2S$, COS) via reaction of $H_2$ and CO with $SO_2$ and/or formed sulfur. These undesirable reactions might be:

$$3H_2 + SO_2 \longrightarrow H_2S + 2H_2O$$
$$H_2 + S \longrightarrow H_2S$$
$$CO + S \longrightarrow COS$$
$$3CO + SO_2 \longrightarrow COS + 2CO_2$$

However, in the presence of the selective catalysts of the present invention process, sulfur recoveries up to 99% can be achieved. The catalysts of the present invention are activated carbons and oxide catalysts, such as aluminum oxide (alumina), silicon oxide (silica), titanium oxide, (titania), zirconium oxide (zirconia), gallium oxide and other oxides that do not undergo a gas solid reaction with $H_2S$ to form sulfides or $SO_2$ to form sulfites or sulfates at the conditions of the present invention process. The catalysts are preferably alumina and silica-based, and more preferably hydrated alumina and silica gel with no metallic impurities. The catalyst of the present invention can have any desired particle size, with particles sizes in the range of from 10 to 300 μm preferred, with particle sizes from 30 to 100 μm being most preferred. The catalyst should have a BET surface area of from 0.1 to 2000 $m^2/g$, preferably from 50 to 500 $m^2/g$. The catalyst also preferably has a pore volume of from 0.06 to 1.1 $cm^3/g$, more preferably from 0.2 to 0.7 $cm^3/g$. The catalyst can be used in either anhydrous or hydrated form, with hydrated alumina or silica gel being preferred.

The pressure of the syngas stream can also be used to affect and enhance sulfur recovery, with pressures from atmospheric to 1200 psig being preferred. In particular, higher pressures (on the order of 300 to 1200 psig) typical of syngas streams enhance sulfur recovery. Using modem gasifiers, that produce syngas up to 1200 psig, sulfur recovery can be further increased because the Claus reaction is thermodynamically favored by a pressure increase. Also, the present invention permits the use of operating temperatures of from 125 to 155° C., which are lower than in conventional Claus plant operation. This range of temperatures also thermodynamically favors sulfur production.

Further, in practicing the present process in a continuous manner (or semicontinuous manner), the space velocity of supply stream gas can be adjusted as needed, depending on factors such as column size and loading, pressure of the gas source, catalyst etc. Preferably, the space velocity is from 1000 to 20000 sec per cc catalyst per hour of supply stream (such as syngas). More preferably the space velocity is in the 3000 to 10000 sec per cc catalyst per hour range. The flow rate of the sulfur dioxide reactant is adjusted to provide an approximately stoichiometric level of sulfur dioxide relative to level of sulfur gases in the the supply stream gas being used. Ideally, the reactors are operated under relatively steady state conditions.

While various oxidants can be used to convert $H_2S$ in the presence of large excesses of $H_2$ and CO as given above, the preferred oxidants for the present process are $SO_2$ and oxygen. Most preferred is $SO_2$. While oxygen and other oxidants can also be used, oxygen is attractive because it eliminates the need for a sulfur burner. However not only is it dangerous to mix oxygen with the syngas but oxygen is also far less selective than $SO_2$ as will be clear from an example provided for the invention.

The process of the present invention can be carried out in any suitable reactor or series of reactors, including but not limited to, fixed bed reactors, moving bed reactors, fluidized bed reactors, slurry bubble column reactors. A preferred reactor for performing the present invention process is a slurry bubble column reactor (SBCR) with the catalyst being suspended in molten sulfur slurry. Such SBCR reactors are described in U.S. Pat. No. 5,348,982, the relevant portions of which are hereby incorporated by reference. The reactor can be made from any suitable material capable of withstanding the reaction and reactant conditions, including but not limited to, silanized or non-silanized stainless steel. The process of the present invention can be performed batchwise, continuously or semi-continuously. Preferably, the process is a continuous process with a portion (preferably one third) of the recovered sulfur being oxidized to sulfur dioxide and recycled to the beginning of the process to be mixed with the incoming syngas.

Figure 2:
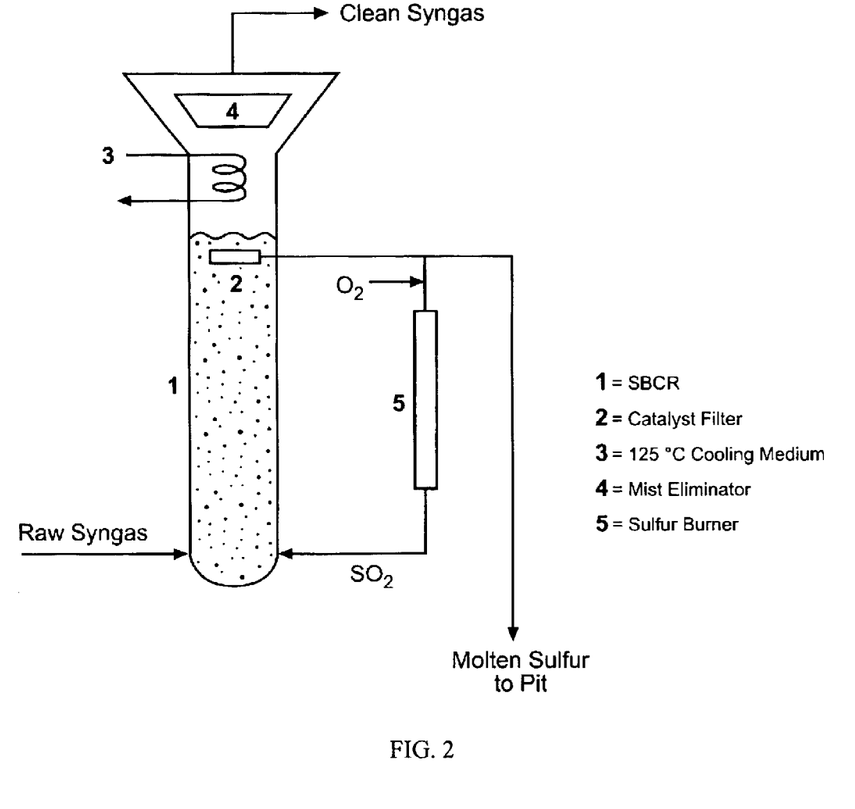
FIG. 2 shows a schematic representation of a preferred embodiment of the process of the present invention.

A preferred embodiment of the present process is shown schematically in FIG. 2. Raw syngas and $SO_2$ enter the SBCR (1), either as two separate streams or, alternatively, as a single pre-mixed stream that has been mixed just prior to entry into the SBCR, and mix and react on the catalyst suspended in molten sulfur itself. The liquid sulfur produced is drawn through a filter (2) (to separate the catalyst) at near the top of the bed. The majority of the sulfur produced, preferably two thirds, is sent to the collection pit for sale or disposal. The remaining portion is directed to a sulfur burner (5) to produce $SO_2$ for the SBCR. Using a cooling medium (3), preferably at about 125C, clean syngas is cooled to slightly above the solidification point of sulfur as it leaves the SBCR. It then passes through a mist eliminator (4) to remove any residual sulfur before leaving the SBCR. The mist eliminator could be conventional packings such as rings, saddles or mesh made from TEFLON (polytetrafluoroethylene, PTFE), silica, alumina or other refractory material.

Suitable catalyst filters (2) include any conventional filter capable of withstanding the conditions of molten sulfur and capable of removing the catalyst particles from the stream. Preferred filters include but are not limited to porous structures made from TEFLON (polytetrafluoroethylene, PTFE), silica, alumina or other refractory materials. The porosity of the filter structure should be such as to allow the molten sulfur to pass through but not the catalyst particles.

The SBCR of the preferred embodiment provides efficient mixing of the gases and very high mass transfer coefficients for diffusion of reactants to the catalyst surface. It is believed that the sulfur forms on the catalyst surface and the molten sulfur continuously washes this adsorbed form of sulfur thereby renewing the surface for more reaction. Experiments have clearly shown that a preferred high surface area alumina catalyst retains the sulfur. Normally in low temperature fixed-bed Claus-type processes, the catalyst is reversibly poisoned by the sulfur plugging the pores. The bed needs to be periodically regenerated at high temperature to drive out the sulfur. An important aspect of the present invention is that the catalyst is not poisoned, and is actually continuously regenerated due to continuous removal of the sulfur as molten sulfur, by the molten sulfur medium itself.

Having generally described this invention, a further understanding can be obtained by reference to certain specific examples that are provided herein for purposes of illustration only and are not intended to be limiting unless otherwise specified.

EXAMPLES

Numerous examples are provided below to support the invention. Tests involving empty non-silanized stainless steel reactor, empty silanized stainless steel reactor, these reactors loaded with catalysts E, N, P, F, and S, and non-silanized stainless steel reactor containing catalyst E suspended in molten sulfur are depicted in these examples.

The catalyst particle sizes were in the 50 to 200 $\mu$m range. The properties of these catalysts are provided in the following table.

| | Catalyst Properties | | |
|---|---|---|---|
| Designation | Type | BET Surface Area ($m^2/g$) | Pore Volume ($cm^3/g$) |
| E | Alumina | 227 | 0.62 |
| N | Alumina | 0.18 | 0.06 |
| P | Alumina | 288 | 0.14 |
| F | Precipitated Iron Oxide | 153 | 0.17 |
| S | Silica gel | 233 | 1.05 |

Under preferred conditions where $SO_2$ and steam are introduced to the silanized reactor followed by dry $H_2S$-containing syngas, sulfur conversions up to 99% were achieved with COS formation remaining below 40 ppmv. The COS formation is attributed to CO reacting with formed sulfur rather than CO reacting with $SO_2$. COS formation mainly occurred on non-silanized reactor walls rather than on the catalyst. Pressure was seen to enhance sulfur conversion, and a ratio of approximately 2 to 1 for $H_2S$ to $SO_2$ was seen to maximize sulfur conversion indicating minimal or no side reactions at preferred operating conditions. Oxygen as an oxidant in place of $SO_2$ was found to be much less selective for $H_2S$ oxidation to sulfur and also resulted in enhanced COS formation. Iron oxide which reacts with $H_2S$ to form sulfide was found to be a very poor nonselective catalyst as seen by the very large COS formation. The catalyst S (silica gel) did not appear to require steam addition to achieve high selectivity. This is attributed to the ready presence of bound water in silica gel. On the other hand, it was found necessary to hydrate the alumina samples to achieve high selectivity and conversion. Overall, high surface area alumina gave the best conversion and selectivity performance (up to 99% with less than 40 ppmv COS formation)

The examples follow:

Example 1

A fixed-bed silanized stainless steel laboratory reactor was loaded with 5 $cm^3$ of alumina catalyst E. Under $N_2$ purge at 300 sccm the reactor was pressurized to 200 psig and heated to 154° C. $SO_2$ was fed into the reactor to achieve 4300 ppmv $SO_2$ in the feed at a total flow rate of 300 sccm. Water converted to steam through a pre-heater was then fed into the reactor at a steam flow of 30 sccm, substituting an equal flow of $N_2$. Once steady state was reached, simulated coal gas with $H_2S$ was begun. The feed composition to the reactor of the mixed gas stream was 26.7% $H_2$, 37.9% CO, 9.3% $CO_2$, 10% steam, 8550 ppmv $H_2S$, 4300 ppmv $SO_2$ and balance $N_2$, and the total wet feed flow was maintained at 300 sccm. The effluent sulfur gases concentration was measured and conversions were calculated. The steady state conversion of $H_2S$, $SO_2$ and $H_2S+SO_2$ was 98.9%, 97.4% and 98.4% respectively. The COS in the effluent was 34 ppmv. The steady state conversions were measured as a function of total system pressure as pressure was increased from 200 psig to 350 psig. These results are shown in Table 1.

TABLE 1

Conversion of Sulfur Compounds as a Function of Total Pressure on Catalyst E at 154° C.

| Pressure (psig) | Conversion (%) | | | COS formation (ppmv) |
|---|---|---|---|---|
| | $H_2S$ | $SO_2$ | $H_2S + SO_2$ | |
| 200 | 98.9 | 97.3 | 98.4 | 34 |
| 240 | 98.9 | 98.4 | 98.7 | 34 |
| 300 | 99.0 | 99.0 | 99.0 | 36 |
| 350 | 98.8 | 99.3 | 99.0 | 38 |

Example 2

For the reactor system of Example 1, the effect of temperature was studied at other conditions identical to Example 1. The temperature was first reduced to 125° C. and then increased to 140° C. and back to 154° C. The results are shown in Table 2.

TABLE 2

Conversion of Sulfur Compounds as a Function of Temperature on Catalyst E at 200 psig

| Temperature (° C.) | Conversion (%) | | | COS formation (ppmv) |
|---|---|---|---|---|
| | $H_2S$ | $SO_2$ | $H_2S + SO_2$ | |
| 125 | 98.7 | 96.2 | 97.9 | 31 |
| 140 | 98.9 | 97.4 | 98.4 | 45 |
| 154 | 99.2 | 98.4 | 98.9 | 85 |

Example 3

For the reactor system of Example 1, the effect of space velocity was studied by varying the total feed flow at other conditions identical to Example 1. The gas+steam flow was increased from 100 sccm up to 500 sccm in 100 sccm steps. The results are shown in Table 3.

TABLE 3

Conversion of Sulfur Compounds as a Function of Total Flow on Catalyst E at 154° C. and 200 psig

| Space Velocity ($h^{-1}$)/ Flow (sccm) | Conversion (%) | | | COS formation (ppmv) |
|---|---|---|---|---|
| | $H_2S$ | $SO_2$ | $H_2S + SO_2$ | |
| 1200/100 | 98.3 | 98.9 | 98.5 | 20 |
| 2400/200 | 98.2 | 97.3 | 97.9 | 18 |
| 3600/300 | 98.1 | 96.4 | 97.5 | 19 |
| 4800/400 | 98.0 | 94.8 | 96.9 | 20 |
| 6000/500 | 97.4 | 93.0 | 95.9 | 24 |

Example 4

For the reactor system of Example 1, the effect of inlet concentration of $SO_2$ was studied by varying the $SO_2$ feed flow at other conditions (temperature, pressure) identical to Example 1. The $SO_2/N_2$ flow was increased from 15 sccm to 18 sccm to 20 sccm while keeping the coal gas and steam flows constant, thus increasing the total flow from 100 sccm to 103 sccm to 105 sccm respectively. The results are shown in Table 4. The $H_2S+SO_2$ conversion was maximized at an intermediate $SO_2$ concentration, which implies reaction of $SO_2$ with $H_2S$ only, and not with $H_2$ or CO (them being in great excess, as noted in Example 1), at least to any appreciable rate.

TABLE 4

Conversion of Sulfur Compounds as a Function of $SO_2$ Inlet Concentration on Catalyst E at 154° C. and 200 psig

| $SO_2$ Concentration (ppm)/Flow (sccm) | Conversion (%) | | | COS formation (ppmv) |
|---|---|---|---|---|
| | $H_2S$ | $SO_2$ | $H_2S + SO_2$ | |
| 3300/15 | 81.4 | 100.0 | 86.6 | 19 |
| 3850/18 | 98.5 | 98.8 | 98.6 | 17 |
| 4200/20 | 99.4 | 86.9 | 95.3 | 21 |

Example 5

For the reactor system of Example 1, the effect of coal gas addition was studied as follows: after the system had reached pseudo steady state under $SO_2$+steam+inert gas ($N_2$) flow at other conditions (temperature, pressure, total flow) identical to Example 1, a part of the inert gas flow was substituted by an equal coal gas flow so as to get a ratio of $H_2S/SO_2$ of ca. 2 and the system was allowed to reach a new pseudo steady state. The same experiment was repeated at a system pressure of 350 psig. The results are shown in Table 5. No measurable reaction (loss of $SO_2$, formation of COS) was observed prior to the addition of coal gas.

TABLE 5

Conversion of Sulfur Compounds after Coal Gas Addition on Catalyst E at 154° C.

| Pressure (psig) | Conversion (%) | | | COS formation (ppmv) |
|---|---|---|---|---|
| | $H_2S$ | $SO_2$ | $H_2S + SO_2$ | |
| 200 | 98.9 | 97.3 | 98.4 | 34 |
| 350 | 98.9 | 98.6 | 98.8 | 95 |

Example 6

For the reactor system of Example 1, the efficiency for sulfur removal was evaluated in relation to the procedure under which the reactive gases were fed into the reactor, at other conditions (temperature, pressure) identical to Example 1. Initially 4300 ppm of $SO_2$ in inert gas ($N_2$) was fed into the reactor at a feed flow of 540 sccm and the system was allowed to reach pseudo steady state. Then, a part of the inert gas flow was substituted by an equal coal gas flow so as to get a ratio of $H_2S/SO_2$ of ca. 2 in the absence of steam (Procedure A). The activity for sulfur removal (measured as $H_2S+SO_2$ conversion) declined from approximately 71% to approximately 42% in a time period of 132 min. The measured COS at 132 min on stream was 575 ppm.

Then, steam was fed into the reactor at a feed rate of 60 sccm (Procedure B), thus increasing the total flow to 600 sccm, while maintaining the reaction temperature and pressure. The sulfur removal activity ($H_2S+SO_2$ conversion) increased from approximately 40% to approximately 62% within 42 min, at which point the experiment was terminated without allowing for the reaction to reach a pseudo steady state. The formation of COS declined rapidly down to 15 ppm after the addition of steam and was maintained below 10 ppm for the duration of this run.

A fresh batch of 5 cm³ catalyst E was loaded into the reactor which was then heated and pressurized under inert gas ($N_2$), until attaining the reaction conditions (temperature, pressure) as described in Example 1. Initially 4300 ppm of $SO_2$ in inert gas ($N_2$) was fed into the reactor at a feed flow of 500 sccm and the system was allowed to reach pseudo steady state. Then, 50 sccm of the inert gas flow were substituted by an equal flow of steam (10% steam addition). After a time period of 30 min, another part of the inert gas flow was substituted by an equal coal gas flow so as to get a ratio of $H_2S/SO_2$ of ca. 2 in the presence of steam, while maintaining the reaction temperature and pressure (Procedure C). The reaction reached pseudo steady state within 20 min. The sulfur removal activity ($H_2S+SO_2$ conversion) was 96% and remained constant for a period of 36 min. The COS formation was constant at 22 ppm. The results of Example 6 are summarized in Table 6. This example illustrates the importance of the order in which reactants should be fed into the reactor, and the importance of the presence of steam.

TABLE 6

Sulfur Removal Activity as Function of Feed Procedure on Catalyst E at 154° C. and 200 psig

| Procedure | Conversion (%) $H_2S + SO_2$ | COS formation (ppmv) |
|---|---|---|
| A ($SO_2$ feed, coal gas feed, no steam feed) | 71 → 42 ↓* | 575 ↑* |
| B (steam feed following Procedure A) | 40 → 62 ↑* | <10 |
| C ($SO_2$ feed, steam feed, coal gas feed) | 96 | 22 |

*Symbol ↓ indicates decreasing value. Symbol ↑ indicates increasing value.

Example 7

For the reactor system of Example 1, the efficiency for sulfur removal under Procedure C was compared to that of another procedure, where 10% steam was fed into the reactor followed by $SO_2$ feed and finally by coal gas feed (Procedure D). The total feed flow was maintained at 100 sccm at other conditions (temperature, pressure) identical to Example 1. The comparative results are given in Table 7. These two procedures give essentially identical results.

TABLE 7

Sulfur Removal Activity as Function of Feed Procedure on Catalyst E at 154° C., 200 psig, and 100 sccm total feed flow

| Procedure | Conversion (%) $H_2S + SO_2$ | COS formation (ppmv) |
|---|---|---|
| C ($SO_2$ feed, steam feed, coal gas feed) | 98.5 | 20 |
| D (steam feed, $SO_2$ feed, coal gas feed) | 98.6 | 20 |

Example 8

For the reactor system of Example 1, the efficiency for sulfur removal under Procedure C was compared to that of another procedure, where 10% steam was fed into the reactor followed by coal gas feed and finally by $SO_2$ feed (Procedure D'). The total feed flow was maintained at 300 sccm at other conditions (temperature, pressure) identical to Example 1. The comparative results are given in Table 8. Again, these two procedures give essentially identical results with respect to sulfur removal activity ($H_2S+SO_2$ conversion). The undesirable formation of COS was enhanced under Procedure D' compared to that of Procedure C.

TABLE 8

Sulfur Removal Activity as Function of Feed Procedure on Catalyst E at 154° C., 200 psig, and 300 sccm total feed flow

| Procedure | Conversion (%) $H_2S + SO_2$ | COS formation (ppmv) |
|---|---|---|
| C ($SO_2$ feed, steam feed, coal gas feed) | 98.4 | 34 |
| D' (steam feed, coal gas feed, $SO_2$ feed) | 98.9 | 85 |

Example 9

For the reactor system of Example 1, the effect of catalytically oxidizing $H_2S$ in the presence of excess $H_2$ and CO by an oxidant other than $SO_2$ (such as $O_2$) was examined on catalyst E. Initially the reactor was heated to 154° C. and pressurized to 200 psig under inert gas ($N_2$) flow of 100 sccm. Then, 10 sccm of the inert gas flow were substituted by an equal flow of steam (10% steam addition). After 30 min, a part of the inert gas flow was substituted by a flow of 2% $O_2$ in $N_2$ that would produce ca. 4300 ppm $O_2$ in the feed, resulting in a total flow of 105 sccm.

A part of the inert gas flow was then substituted by an equal flow of coal gas so as to get a ratio of $H_2S/O_2$ of ca. 2 and the reaction reached a pseudo steady state. Finally, the $O_2$ flow was substituted by a flow of $SO_2$ that would produce ca. 4300 ppm of $SO_2$ in the feed ($H_2S/SO_2$ ratio of ca. 2) and the reaction reached a new pseudo steady state. The results for the effect of $O_2$ vs. $SO_2$ in the feed are given in Table 7. Oxygen is much less selective for the oxidation of $H_2S$ compared to $SO_2$ and also allows for enhanced undesirable formation of COS. There appears to be a clear unselective consumption of $O_2$ by the $H_2$ and/or CO of the coal gas, thus limiting its availability for the desirable selective reaction with $H_2S$.

TABLE 9

Conversion of Sulfur Compounds as Function of $O_2$ vs. $SO_2$ in the Feed on Catalyst E at 154° C. and 200 psig

| Oxidant (ppmv) | Conversion (%) | | | COS formation (ppmv) |
| | $H_2S$ | $SO_2$ | $H_2S + SO_2$ | |
|---|---|---|---|---|
| $O_2$ (4300) | 41.1 | — | — | 310 |
| $SO_2$ (4300) | 89.1 | 99.9 | 92.7 | 170 |

Example 10

For the silanized stainless steel fixed-bed reactor system of Example 1, the effect of temperature was studied in the absence of catalyst (blank reactor run) and of steam in the feed (dry feed). Under $N_2$ purge the reactor was pressurized to 200 psig and heated to 60° C. $SO_2$ was then fed into the reactor to achieve 3800 ppm $SO_2$ in the feed, followed by feeding coal gas to achieve 8900 ppm $H_2S$ ($H_2S/SO_2$=2.3), with the concentration of the remaining species (except for steam) the same as that of Example 1 (Procedure A). The total feed flow was maintained at 270 sccm. After establishing pseudo steady state, the reactor temperature was increased from 60° C. to 120° C. in 20° C. steps and then to 140° C. in 10° C. steps. All measured conversions decreased with increasing reaction temperature, indicating adsorption-controlled reaction on the reactor walls (homogeneous, and kinetically-controlled or desorption-controlled heterogeneous reaction would be favored by increasing temperature). The results are shown in Table 10.

TABLE 10

Conversion of Sulfur Compounds as a Function of Temperature in Blank Reactor at 200 psig

| Temperature (° C.) | Conversion (%) | | | COS formation (ppmv) |
| --- | --- | --- | --- | --- |
| | $H_2S$ | $SO_2$ | $H_2S + SO_2$ | |
| 60 | 3.9 | 6.1 | 4.5 | <30 |
| 80 | 3.2 | 6.0 | 4.0 | <30 |
| 100 | 3.2 | 5.8 | 4.0 | <30 |
| 120 | 2.9 | 5.6 | 3.7 | <30 |
| 130 | 1.3 | 3.0 | 1.8 | <30 |
| 140 | 0.8 | 2.7 | 1.3 | <30 |

Example 11

For the blank reactor system of Example 10, the effect of temperature was further studied under a different feed procedure. After pressurization to 200 psig under $N_2$ flow of 270 sccm, coal gas was fed into the reactor to achieve 8650 ppm $H_2S$ in the feed, followed by feeding $SO_2$ to achieve 4100 ppm in the feed ($H_2S/SO_2$=2.1), with the concentration of the remaining species the same as in Example 10 (Procedure A'). After establishing pseudo steady state, the reactor temperature was increased from 140° C. to 160° C. in 10° C. steps. Again, all measured conversions decreased with increasing reaction temperature, indicating adsorption-controlled reaction on the reactor walls. The $H_2S+SO_2$ conversion at 140° C. was slightly higher than before (Example 10) probably due to a $H_2S/SO_2$ ratio closer to stoichiometric. The results are shown in Table 11.

TABLE 11

Conversion of Sulfur Compounds as a Function of Temperature in Blank Reactor at 200 psig

| Temperature (° C.) | Conversion (%) | | | COS formation (ppmv) |
| --- | --- | --- | --- | --- |
| | $H_2S$ | $SO_2$ | $H_2S + SO_2$ | |
| 140 | 1.3 | 2.3 | 1.6 | <30 |
| 150 | 0.9 | 1.3 | 1.0 | <30 |
| 160 | 0.3 | 0.4 | 0.3 | <30 |

Example 12

For the blank reactor system of Example 10, the effect of pressure was studied at a reaction temperature of 160° C. After pressurizing to 200 psig under $N_2$ flow of 270 sccm, $SO_2$ was fed into the reactor to achieve 4300 ppm $SO_2$ in the feed, followed by feeding coal gas to achieve 8500 ppm $H_2S$ in the feed ($H_2S/SO_2$=2.0), with the concentration of the remaining species the same as in Example 10 (Procedure A). After establishing pseudo steady state, the pressure was increased to 300 psig and then to 400 psig. The results are shown in Table 12.

TABLE 12

Conversion of Sulfur Compounds as a Function of Total Pressure in Blank Reactor at 160° C.

| Pressure (psig) | Conversion (%) | | | COS formation (ppmv) |
| --- | --- | --- | --- | --- |
| | $H_2S$ | $SO_2$ | $H_2S + SO_2$ | |
| 200 | 3.8 | 3.5 | 3.7 | 30 |
| 300 | 4.9 | 5.3 | 5.0 | 40 |
| 400 | 6.9 | 6.1 | 6.7 | 60 |

Example 13

For the blank reactor system of Example 10, the effect of addition of 10% steam was studied at a reaction temperature of 160° C. After pressurizing to 200 psig under $N_2$ flow of 270 sccm, coal gas was fed into the reactor to achieve 8500 ppm $H_2S$ in the feed, followed by feeding $SO_2$ to achieve 4300 ppm $SO_2$ in the feed ($H_2S/SO_2$=2.0), with the concentration of the remaining species the same as in Example 10 (Procedure A'). After establishing pseudo steady state, 30 sccm of steam were fed into the reactor (Procedure B'), thus increasing the total flow to 300 sccm, while maintaining the reaction temperature and pressure. The comparative results are shown in Table 13. The addition of steam enhanced the sulfur removal activity extensively, even in the absence of catalyst (blank reactor).

TABLE 13

Sulfur Removal Activity as Function of Feed Procedure in Blank Reactor at 160° C. and 200 psig

| Procedure | Conversion (%) $H_2S + SO_2$ | COS formation (ppmv) |
| --- | --- | --- |
| A' (coal gas feed, $SO_2$ feed, no steam feed) | 3.7 | 30 |
| B' (steam feed following Procedure A') | 51.9 | 60 |

Example 14

For the blank reactor system of Example 10, the effect of pressure was studied in the presence of 10% steam in the feed at the reaction temperature of 156° C. After pressurizing to 200 psig under $N_2$ flow of 180 sccm, 20 sccm of steam were fed into the reactor to produce 10% steam at a total flow of 200 sccm. Coal gas was then fed into the reactor to achieve 8500 ppm $H_2S$ in the feed, followed by feeding $SO_2$ to achieve 3800 ppm $SO_2$ in the feed ($H_2S/SO_2$=2.2), with the concentration of the remaining species the same as in Example 10 (Procedure D'). After establishing pseudo steady state, the pressure was increased to 300 psig and then to 380 psig. The results are shown in Table 14. Higher pressures enhance the adsorption of the reactant species onto the reactor walls, thus promoting the heterogeneous reaction.

TABLE 14

Conversion of Sulfur Compounds as a Function of Total Pressure in Blank Reactor at 156° C.

| Pressure (psig) | Conversion (%) | | | COS formation (ppmv) |
|---|---|---|---|---|
| | $H_2S$ | $SO_2$ | $H_2S + SO_2$ | |
| 200 | 59.2 | 62.3 | 60.2 | <30 |
| 300 | 69.7 | 78.3 | 72.3 | <30 |
| 380 | 73.8 | 89.1 | 78.5 | 30 |

Example 15

For the silanized reactor system of Examples 1 & 10, the efficiency for sulfur removal of the empty reactor was compared to that of the reactor loaded with catalyst E, under the same feed procedure: 10% steam feed, followed by coal gas feed and finally by $SO_2$ feed (Procedure D'). The total feed flow was 200 sccm for the empty reactor and 300 sccm for that loaded with catalyst E. Also, the $SO_2$ feed concentration was 3800 ppm and 4300 ppm, respectively, all other reaction parameters being the same. The comparative results (from Tables 14 and 2, respectively) are given in Table 15.

The presence of catalyst E increases the sulfur removal activity to essentially equilibrium levels. Even if the $SO_2$ inlet concentration in the case of the empty reactor were 4300 ppm as opposed to 3800 ppm, and if all the extra 500 ppm $SO_2$ were to react with 1000 ppm of $H_2S$, the total sulfur removal ($H_2S+SO_2$ conversion) would only increase to 65.6%, still much lower compared to that in the presence of catalyst E. The contribution of the reactor walls to the sulfur removal activity for the empty reactor is significant, but would be expected to be substantially lesser at a higher total feed flow (300 sccm vs. 200 sccm).

TABLE 15

Sulfur Removal Activity of Empty Reactor vs. Reactor Loaded with Catalyst E at 156° C./154° C. and 200 psig

| Reactor | Total Flow (sccm) | $SO_2$ Inlet (ppm) | Conversion (%) $H_2S + SO_2$ | COS formation (ppmv) |
|---|---|---|---|---|
| Empty Reactor | 200 | 3800 | 60.2 | <30 |
| Reactor with Catalyst E | 300 | 4300 | 98.9 | 85 |

Example 16

The effect of reaction temperature was studied in the absence of catalyst (blank reactor run) in a fixed-bed non-silanized stainless steel laboratory reactor otherwise the same as that in Examples 1 & 10. The empty stainless-steel reactor was pressurized to 300 psig and heated to 156° C. under inert flow of 86 sccm. 10% steam (8.6 sccm) was fed into the reactor. Then, coal gas was fed into the reactor to achieve 9300 ppm $H_2S$ in the feed, followed by feeding $SO_2$ to achieve 4500 ppm $SO_2$ ($H_2S/SO_2$=2.1) with the concentration of the remaining species the same as that of Example 10 (Procedure D'). The total feed flow was maintained at 86 sccm. After establishing pseudo steady state, the reactor temperature was decreased from 156° C. to 140° C. and then to 125° C. The sulfur removal activity ($H_2S+SO_2$ conversion) increased with decreasing reaction temperature, indicating adsorption-controlled reaction on the reactor walls. The results are shown in Table 16.

TABLE 16

Conversion of Sulfur Compounds as a Function of Temperature in Blank Stainless-Steel Reactor at 300 psig

| Temperature (° C.) | Conversion (%) | | | COS formation (ppmv) |
|---|---|---|---|---|
| | $H_2S$ | $SO_2$ | $H_2S + SO_2$ | |
| 156 | 82.3 | 84.4 | 83.0 | 550 |
| 140 | 84.4 | 84.4 | 84.4 | 300 |
| 125 | 88.7 | 84.4 | 87.3 | 200 |

Example 17

For the blank stainless-steel reactor system of Example 16, the effect of pressure was studied at a reaction temperature of 125° C. After pressurizing to 200 psig under $N_2$ flow of 86 sccm, $SO_2$ was fed into the reactor followed by steam and then by coal gas to achieve a concentration of all species the same as in Example 16 (Procedure C). After establishing pseudo steady state, the pressure was increased to 250 psig and then to 300 psig. The results are shown in Table 17. The conversion of $H_2S$ became progressively greater than that of $SO_2$ with increasing reaction pressure (difference of -0.4% at 200 psig to +2.7% at 300 psig), in parallel to an increase in the formation of COS. Therefore, despite its reasonably high sulfur removal activity at a low space velocity, the stainless-steel reactor is quite unselective since it also promotes the undesirable formation of COS, especially at elevated pressures.

TABLE 17

Conversion of Sulfur Compounds as a Function of Total Pressure in Blank Stainless-Steel Reactor at 125° C.

| Pressure (psig) | Conversion (%) | | | COS formation (ppmv) |
|---|---|---|---|---|
| | $H_2S$ | $SO_2$ | $H_2S + SO_2$ | |
| 200 | 73.2 | 73.6 | 73.3 | 130 |
| 250 | 81.7 | 80.7 | 81.4 | 500 |
| 300 | 85.4 | 82.7 | 84.5 | 600 |

Example 18

For the blank stainless-steel reactor of Example 16, the effect of addition of 10% steam was studied at a reaction temperature of 125° C. After pressurizing to 200 psig under $N_2$ flow of 77.4 sccm, $SO_2$ was fed into the reactor to achieve 4500 ppm $SO_2$ in the feed, followed by feeding coal gas to achieve 9300 ppm $H_2S$ in the feed ($H_2S/SO_2$=2.1), with the concentration of all species (except for steam) the same as in Example 16 (Procedure A). After establishing pseudo steady state, 8.6 sccm of steam were fed into the reactor (Procedure B), thus increasing the total flow to 86 sccm, while maintaining the reaction temperature and pressure. The comparative results are shown in Table 18. The addition of steam enhanced the sulfur removal activity but also significantly enhanced the formation of COS.

TABLE 18

Sulfur Removal Activity as Function of Feed Procedure in Blank Stainless-Steel Reactor at 125° C. and 200 psig

| Procedure | Conversion (%) $H_2S + SO_2$ | COS formation (ppmv) |
|---|---|---|
| A ($SO_2$ feed, coal gas feed, no steam feed) | 46.2 | 100 |
| B (steam feed following Procedure A) | 69.7 | 1300 |

Example 19

The efficiency for sulfur removal of the empty stainless-steel non-silanized reactor was compared to that of the empty silanized reactor, under the same feed procedure: $SO_2$ feed followed by coal gas feed with no steam feed (Procedure A). The total feed flow was 77.4 sccm for the non-silanized reactor and 270 sccm for the silanized reactor. The $SO_2$ feed concentration was 4500 ppm and 3800 ppm, respectively, and the $H_2S$ feed concentration was 9300 ppm and 8900 ppm, respectively, all other concentrations being the same. The comparative results (from Tables 18 and 10, respectively) are given in Table 19.

The silanized reactor was clearly less reactive compared to the non-silanized one in the absence of steam in the feed for both the desirable $H_2S+SO_2$ reaction as well as the undesirable formation of COS. Since the combined $H_2S+SO_2$ conversion was quite low (<4%), an inversely proportional relation to total flow could be assumed. Thus, a 3.5-fold decrease in total flow (from 270 down to 77 sccm) would be expected to increase the combined conversion to ca. 3.5*3.7%=13% or lower, a value which is still substantially lower than the 46% conversion for the non-silanized reactor.

TABLE 19

Sulfur Removal Activity in Blank non-Silanized Reactor vs. Blank Silanized Reactor at 200 psig

| Reactor | Temperature (° C.) | Flow (sccm) | $H_2S/SO_2$ Ratio (-) | Conversion (%) $H_2S + SO_2$ | COS formation (ppmv) |
|---|---|---|---|---|---|
| Non-Silanized | 125 | 77 | 2.1 | 46.2 | 100 |
| Silanized | 120 | 270 | 2.3 | 3.7 | <30 |
| Silanized | 130 | 270 | 2.3 | 1.8 | <30 |

Example 20

The efficiency for sulfur removal of the empty stainless-steel non-silanized reactor was compared to that of the empty silanized reactor, under the same feed procedure: 10% steam feed followed by $SO_2$ feed and finally by coal gas feed (Procedure D'). The total feed flow was 86 sccm and 200 sccm, respectively. The $SO_2$ feed concentration was 4500 ppm and 3800 ppm, and the $H_2S$ concentration was 9300 ppm and 8500 ppm, respectively, all other concentrations being the same. The comparative results (from Tables 16 and 14, respectively) are given in Table 20. The sulfur removal activity of the two reactor types was apparently the same, within the uncertainty of the different total flow. The formation of COS, however, was lower by more than one order of magnitude in the case of the silanized reactor.

TABLE 20

Sulfur Removal Activity in Blank non-Silanized Reactor vs. Blank Silanized Reactor at 156° C. and 300 psig

| Reactor | Temperature (° C.) | Flow (sccm) | $H_2S/SO_2$ Ratio (-) | Conversion (%) $H_2S + SO_2$ | COS formation (ppmv) |
|---|---|---|---|---|---|
| Non-Silanized | 156 | 86 | 2.1 | 83.0 | 550 |
| Silanized | 156 | 200 | 2.2 | 72.3 | <30 |

Example 21

For the blank stainless-steel reactor system of Example 16, the effect of pressure was studied at 156° C. under high (22.5%) steam concentration. After pressurizing to 200 psig under $N_2$ flow of 100 sccm, 22.5% steam was fed into the reactor. Then, coal gas was fed followed by $SO_2$ to achieve a concentration of all species (except steam) the same as in Example 16 (Procedure D'), and a total feed flow of 100 sccm. After establishing pseudo steady state, the pressure was increased to 250 psig and then to 300 psig. The results are shown in Table 21.

TABLE 21

Conversion of Sulfur Compounds as a Function of Total Pressure in Blank Stainless-Steel Reactor at 156° C. and 22.5% Steam

| Pressure (psig) | Conversion (%) | | | COS formation (ppmv) |
| | $H_2S$ | $SO_2$ | $H_2S + SO_2$ | |
|---|---|---|---|---|
| 200 | 69.9 | 75.6 | 71.7 | 350 |
| 250 | 79.0 | 82.2 | 80.1 | 450 |
| 300 | 83.9 | 87.8 | 85.1 | 550 |

Example 22

For the blank stainless-steel reactor system of Example 16, the effect of variation in steam concentration (22.5% vs. 10.0%) was studied at a reaction temperature of 156° C. and pressure of 300 psig, under the same feed procedure (Procedure D') and concentration of all other species as in Example 16. The total feed flow was 100 sccm and 86 sccm, respectively. The comparative results (from Tables 21 and 16, respectively) are shown in Table 22. No significant variation in sulfur removal activity or COS formation was observed for 22.5% vs. 10% steam.

TABLE 22

Sulfur Removal Activity as Function of Steam Concentration in Blank Stainless-Steel Reactor at 156° C. and 300 psig

| Steam Concentration (%) | Feed flow (sccm) | Conversion (%) $H_2S + SO_2$ | COS formation (ppmv) |
|---|---|---|---|
| 22.5 | 100 | 85.1 | 550 |
| 10.0 | 86 | 83.0 | 550 |

Example 23

The fixed-bed non-silanized stainless-steel reactor described in Example 16 was loaded with 5 $cm^3$ of alumina catalyst N and the reactor was heated to 158° C. and pressurized to 100 psig under inert ($N_2$) flow of 100 sccm. $SO_2$ was fed into the reactor at a flow of 13.2 sccm to achieve 3900 ppm $SO_2$ in the feed, followed by addition of 22.5% steam and then by addition of coal gas to achieve 9000 ppm $H_2S$ in the feed, while maintaining a constant total flow of 100 sccm. The effect of inlet concentration of $SO_2$ was studied by increasing the $SO_2/N_2$ flow from 13.2 sccm to 19.2 sccm in 2 sccm steps, thus increasing the total flow from 100 sccm to 106 sccm in 2 sccm steps respectively. The results are shown in Table 23. A substantial variation in $SO_2$ concentration (from 3900 ppm to 5200 ppm) had minimal effect on the sulfur removal activity, in clear contrast to results from a similar experiment on catalyst E (Table 4), suggesting a partial contribution of the stainless-steel reactor walls on the activity for sulfur removal. Interestingly, the converted amounts of $H_2S$ and $SO_2$ match the 2:1 $H_2S$-to-$SO_2$ reaction stoichiometry quite well, suggesting only minor reaction with $H_2$ or CO at these reaction conditions.

TABLE 23

Conversion of Sulfur Compounds as a Function of $SO_2$ Inlet Concentration on Catalyst N at 158° C. and 100 psig

| $SO_2$ Concentration (ppm)/Flow | Converted amount (ppm) | | Conversion (%) | COS formation |
|---|---|---|---|---|
| (sccm) | ½ $H_2S$ | $SO_2$ | $H_2S + SO_2$ | (ppmv) |
| 3900/13.2 | 2175 | 2150 | 50.4 | 70 |
| 4400/15.2 | 2250 | 2200 | 50.4 | 65 |
| 4850/17.2 | 2375 | 2350 | 52.4 | 80 |
| 5200/19.2 | 2350 | 2350 | 51.3 | 110 |

Example 24

The fixed-bed silanized stainless-steel reactor described in Example 1 was loaded with 5 cm³ of alumina catalyst P and the reactor was heated to 154° C. and pressurized to 200 psig under inert ($N_2$) flow of 300 sccm. 10% steam (30 sccm) was fed into the reactor (substituting an equivalent flow of inert gas), followed by addition of $SO_2$ to achieve 4350 ppm $SO_2$ in the feed and then by addition of coal gas to achieve 8500 ppm $H_2S$ in the feed (Procedure D), while maintaining a constant total flow of 300 sccm and a concentration of the remaining species the same as in Example 1. After establishing pseudo steady state, the pressure was increased to 290 psig. The results of the effect of pressure are shown in Table 24.

TABLE 24

Conversion of Sulfur Compounds as a Function of Total Pressure on Catalyst P at 154° C. (Procedure D)

| | Conversion (%) | | | COS formation |
|---|---|---|---|---|
| Pressure (psig) | $H_2S$ | $SO_2$ | $H_2S + SO_2$ | (ppmv) |
| 200 | 99.2 | 87.1 | 95.1 | 235 |
| 290 | 99.4 | 94.7 | 97.8 | 310 |

Example 25

For the reaction system of Example 24 the effect of pressure was also examined under a different feed procedure: after heating to 154° C. and pressurizing to 200 psig under inert flow of 300 sccm, $SO_2$ was fed into the reactor to achieve 4600 ppm $SO_2$ in the feed, followed by 10% steam feed and then by coal gas feed to achieve 8500 ppm $H_2S$ in the feed, at other conditions identical to Example 24 (Procedure C). After establishing pseudo steady state, the pressure was increased to 275 psig. The results are given in Table 25.

TABLE 25

Conversion of Sulfur Compounds as a Function of Total Pressure on Catalyst P at 154° C. (Procedure C)

| | Conversion (%) | | | COS formation |
|---|---|---|---|---|
| Pressure (psig) | $H_2S$ | $SO_2$ | $H_2S + SO_2$ | (ppmv) |
| 200 | 99.5 | 88.5 | 95.6 | 45 |
| 275 | 99.8 | 91.3 | 96.8 | 45 |

Example 26

For the reactor system of Example 24, the efficiency for sulfur removal under Procedure D (steam followed by $SO_2$ and then by coal gas feed) was compared to that of Procedure C ($SO_2$ followed by steam and then by coal gas feed). The total feed flow was maintained at 300 sccm. The $SO_2$ feed concentration was 4350 ppm and 4600 ppm, respectively ($H_2S/SO_2$ ratio of 2.0 and 1.8, respectively), all other concentrations and conditions (temperature, pressure) being the same. The comparative results (from Tables 24 and 25, respectively) are given in Table 26.

The two feed procedures give essentially identical results with respect to sulfur removal activity. However, the formation of COS was significantly enhanced under Procedure D (with essentially stoichiometric $SO_2$) compared to that of Procedure C (with excess $SO_2$), suggesting that COS formation may be due to reaction of CO with active sulfur rather than with $SO_2$.

TABLE 26

Sulfur Removal Activity as Function of Feed Procedure on Catalyst P at 154° C., 200 psig, and 300 sccm total feed flow

| Procedure | $SO_2$ feed concentration (ppm) | Conversion (%) $H_2S + SO_2$ | COS formation (ppmv) |
|---|---|---|---|
| D (steam feed, $SO_2$ feed, coal gas feed) | 4350 | 95.1 | 235 |
| C ($SO_2$ feed, steam feed, coal gas feed) | 4600 | 95.6 | 45 |

Example 27

The efficiency for sulfur removal of catalyst P was compared to that of catalyst E under the same feed procedure: $SO_2$ feed followed 10% steam and then by coal gas feed (Procedure C). The $SO_2$ feed concentration was 4600 ppm and 4350 ppm, respectively, all other concentrations and conditions (temperature, pressure, total flow) being the same. The comparative results (from Tables 25 and 1, respectively) are given in Table 27. Both the sulfur removal activity and the formation of COS were very similar for the two catalysts P and E within the uncertainty arising from the different $SO_2$ feed concentration.

TABLE 27

Sulfur Removal Activity on Catalyst P vs. Catalyst E at 154° C., 200 psig, and 300 sccm total feed flow

| Catalyst | Procedure | $SO_2$ feed concentration (ppm) | Conversion (%) $H_2S + SO_2$ | COS formation (ppmv) |
|---|---|---|---|---|
| P | C | 4600 | 95.6 | 45 |
| E | C | 4350 | 98.4 | 34 |

Example 28

The fixed-bed silanized stainless-steel reactor described in Example 1 was loaded with 5 cm$^3$ of iron oxide catalyst F and the reactor was heated to 154° C. and pressurized to 200 psig under inert ($N_2$) flow of 300 sccm. 10% steam (30 sccm) was fed into the reactor (substituting an equivalent flow of inert gas), followed by addition of coal gas to achieve 8500 ppm $H_2S$ in the feed. The catalyst was treated under the steam-coal gas mixture for 12 hours. Then $SO_2$ was fed into the reactor (55 sccm of $SO_2/N_2$) to achieve 4300 ppm $SO_2$ in the feed (Procedure D'), while maintaining a constant total flow of 300 sccm and a concentration of the remaining species the same as in Example 1. After establishing pseudo steady state, the $SO_2/N_2$ flow was decreased to 50, 40, and 20 sccm (the total feed flow decreased from 300 sccm to 295, 285, and 265 sccm, respectively), which decreased the $SO_2$ concentration from 4300 ppm to 1750 ppm and, as a result increased the $H_2S$ concentration from 8500 ppm to 9800 ppm. Finally, the 20 sccm $SO_2/N_2$ flow was substituted by an equal $N_2$ flow. The results of the effect of decreasing $SO_2$ concentration are shown in Table 28. Despite the high sulfur removal, the COS formation is clearly dominant and is positively correlated with the $SO_2$ inlet concentration. The sulfur balance results support the indirect formation of COS by reaction with active sulfur from the $H_2S+SO_2$ reaction.

TABLE 28

Conversion of Sulfur Compounds as a Function of $SO_2$ Inlet Concentration on Catalyst F at 154° C. and 200 psig

| Total feed flow (sccm)/$SO_2$/ $N_2$ flow (sccm) | Inlet concentration (ppm) | | Conversion (%) | COS formation |
|---|---|---|---|---|
| | $H_2S$ | $SO_2$ | $H_2S + SO_2$ | (ppmv) |
| 300/55 | 8500 | 4300 | 98.4 | 8580 |
| 290/50 | 8650 | 4000 | 97.2 | 8870 |
| 285/40 | 8950 | 3300 | 91.7 | 7600 |
| 265/20 | 9600 | 1750 | 69.5 | 4130 |
| 265/0 (20 sccm $N_2$) | 9600 | 0 | 30.6↓* | 800↓ |

*Symbol ↓ indicates decreasing value.

Example 29

For the reaction system of Example 28, the effect of increasing $SO_2$ inlet concentration was also studied after the catalyst F was again treated under a steam-coal gas mix for 12 hours. Again, $SO_2$ was fed into the reactor (55 sccm of $SO_2/N_2$) to achieve 4300 ppm $SO_2$ in the feed (Procedure D'), while maintaining a constant total flow of 300 sccm and a concentration of the remaining species the same as in Example 28. After establishing pseudo steady state, the $SO_2/N_2$ flow was increased to 65, 75, and 95 sccm (the total feed flow increased from 300 sccm to 310, 320, and 340 sccm, respectively), which increased the $SO_2$ concentration from 4300 ppm to 6550 ppm and, as a result decreased the $H_2S$ concentration from 8500 ppm to 7500 ppm. Finally, the coal gas flow was substituted by an equal $N_2$ flow. The results of the effect of increasing the $SO_2$ concentration are shown in Table 29.

The formation of COS is significantly higher than in Example 28 and is again an increasing function of the $SO_2$ inlet concentration. The sulfur balance results indicate that the total outlet sulfur (from unreacted $H_2S$ and $SO_2$, and formed COS) is about 110% of the total inlet sulfur, implying complete conversion of the sulfur formed by the $H_2S+SO_2$ reaction into COS, as well as some reaction of CO with residual sulfur on the catalyst surface. After stopping the coal gas flow (steam, $SO_2/N_2$, and $N_2$ instead of coal gas) the formation of COS decreased rapidly (within 12 min) to very low levels; in contrast, $SO_2$ did not reach pseudo steady state even after about 1 hour. Again, the formation of COS appears to be linked to the formation of active sulfur from the $H_2S+SO_2$ reaction rather than the direct reaction of CO with $SO_2$.

TABLE 29

Conversion of Sulfur Compounds as a Function of $SO_2$ Inlet Concentration on Catalyst F at 154° C. and 200 psig

| Total feed flow (sccm)/$SO_2$/ $N_2$ flow (sccm) | Inlet concentration (ppm) | | Conversion (%) | COS formation |
|---|---|---|---|---|
| | $H_2S$ | $SO_2$ | $H_2S + SO_2$ | (ppmv) |
| 300/55 | 8500 | 4300 | 92.9 | 13140 |
| 310/65 | 8250 | 4900 | 96.9 | 13700 |
| 320/75 | 7950 | 5500 | 94.5 | 14190 |
| 340/95 | 7500 | 6550 | 87.7 | 14220 |
| 340/95 (no coal gas) | 0 | 6550 | 21.8↓ | 13↓ |

*Symbol ↓ indicates decreasing value.

Example 30

The fixed-bed silanized stainless-steel reactor described in Example 1 was loaded with 5 cm$^3$ of silica gel catalyst S and the reactor was heated to 154° C. and pressurized to 200 psig under inert ($N_2$) flow of 300 sccm. Substituting 30 sccm of inert gas, 30 sccm (10%) steam were fed into the reactor, followed by addition of coal gas to achieve 8200 ppm $H_2S$ in the feed, and by $SO_2/N_2$ to achieve 4400 ppm $SO_2$ in the feed (Procedure D') at 300 sccm, the concentration of the other species the same as in Example 1. After establishing pseudo steady state, the reaction pressure was increased from 200 psig to 250 and then to 300 psig. The results for the effect of pressure are given in Table 30. The COS formation appears to be unaffected by this pressure variation.

TABLE 30

Conversion of Sulfur Compounds as a Function of Total Pressure on Catalyst S at 154° C. and 300 sccm (Procedure D')

| Pressure (psig) | Conversion (%) | | | COS formation (ppmv) |
|---|---|---|---|---|
| | $H_2S$ | $SO_2$ | $H_2S + SO_2$ | |
| 200 | 91.0 | 80.8 | 87.4 | 170 |
| 250 | 97.4 | 90.0 | 94.8 | 150 |
| 300 | 98.4 | 92.0 | 96.2 | 160 |

Example 31

For the reaction system of Example 30, the effect of oxidizing $H_2S$ by oxygen compared to $SO_2$ was studied on catalyst S. At 154° C. and 200 psig under inert gas flow of 300 sccm, 10% steam was added, followed by $SO_2/N_2$ to achieve 4450 ppm $SO_2$ in the feed, and then by coal gas to achieve 8200 ppm $H_2S$ in the feed at 300 sccm (Procedure D), all other concentrations being the same as in Example 30. After reaching pseudo steady state, the $SO_2/N_2$ flow was substituted by a flow of 2% $O_2/N_2$ to produce ca. 4450 ppm $O_2$ in the feed (the total feed flow increased to 314 sccm) and the reaction reached a new pseudo steady state. Finally, the $O_2/N_2$ flow was back substituted with $SO_2/N_2$ flow (the total flow returned to 300 sccm) and a new pseudo steady state was attained. The results of the $SO_2$ to $O_2$ to $SO_2$ switch are shown in Table 31.

In agreement to results with catalyst E (see Table 9), oxygen is significantly less selective for the oxidation of $H_2S$ (as implied by the lower conversion of $H_2S$) and also shows enhanced formation of COS. There appears to be an unselective consumption of $O_2$ by the $H_2$ and/or CO of the coal gas, thus limiting its availability for the selective reaction with $H_2S$.

TABLE 31

Conversion of Sulfur Compounds as a Function of $O_2$ vs. $SO_2$ in the Feed on Catalyst S at 154° C. and 200 psig (Procedure D)

| Oxidant | Conversion (%) | | | COS formation |
|---|---|---|---|---|
| (ppmv) | $H_2S$ | $SO_2$ | $H_2S + SO_2$ | (ppmv) |
| $SO_2$ (4450) | 93.8 | 85.0 | 90.7 | 140 |
| $O_2$ (4450) | 31.8 | — | — | 510 |
| $SO_2$ (4450) | 92.7 | 83.3 | 89.4 | 180 |

Example 32

The fixed-bed silanized stainless-steel reactor described in Example 1 was loaded with a fresh load of 5 cm³ of catalyst S and the reactor was heated to 154° C. and pressurized to 200 psig under inert ($N_2$) flow of 270 sccm. Initially coal gas was fed into the reactor to achieve 8200 ppm $H_2S$ in the feed, followed by addition of $SO_2/N_2$ to achieve 4400 ppm $SO_2$ in the feed in the absence of steam (Procedure A'), the concentration of the other species the same as in Example 1. After establishing pseudo steady state, 30 sccm of steam were added to the feed, increasing the total feed flow to 300 sccm at constant reaction temperature and pressure (Procedure B'), and the reaction reached a new pseudo steady state. The results for the effect of addition of 10% steam are given in Table 32. There appears to be only minimal effect of steam addition on sulfur removal activity as well as on COS formation.

TABLE 32

Sulfur Removal Activity as Function of Feed Procedure on Catalyst S at 154° C. and 200 psig

| Procedure | Feed flow (sccm) | Conversion (%) $H_2S + SO_2$ | COS formation (ppmv) |
|---|---|---|---|
| A' (coal gas feed, $SO_2$ feed, no steam feed) | 270 | 91.1 | 80 |
| B' (steam feed following Procedure A') | 300 | 88.3 | 115 |

Example 33

The effect of steam addition was also examined on catalyst S at a reaction pressure of 100 psig under the same feed procedure, reaction conditions and feed composition as in Example 32. Again, after establishing a pseudo steady state, 30 sccm of steam were added, increasing the total feed flow to 300 sccm at constant reaction temperature and pressure (Procedure B'), and the reaction reached a new pseudo steady state. Finally, the steam feed was closed (Procedure A") and a new pseudo steady state was attained. The results for the effect of addition of 10% steam at 100 psig are shown in Table 33. In agreement with the results at 200 psig (Table 32), steam addition has minimal effect on sulfur removal activity as well as on COS formation. Removal of steam from the feed causes the reaction to return to its former pseudo steady state.

TABLE 33

Sulfur Removal Activity as Function of Feed Procedure on Catalyst S at 154° C. and 100 psig

| Procedure | Feed flow (sccm) | Conversion (%) $H_2S + SO_2$ | COS formation (ppmv) |
|---|---|---|---|
| A' (coal gas feed, $SO_2$ feed, no steam feed) | 270 | 85.8 | 115 |
| B' (steam feed following Procedure A') | 300 | 78.0 | 135 |
| A" (no steam feed following Procedure B') | 270 | 82.4 | 115 |

Example 34

The efficiency for sulfur removal of catalyst S was compared to that of catalyst E under the same feed procedure: 10% steam feed followed by coal gas and then by $SO_2$ feed (Procedure D'). The $SO_2$ feed concentration was 4400 ppm and 4350 ppm, respectively, and the $H_2S$ feed concentration was 8200 ppm and 8550 ppm, respectively, all other concentrations and conditions (temperature, pressure, total flow) being the same. The comparative results (from Tables 30 and 2, respectively) are given in Table 34. Catalyst E appears to be superior to catalyst S with respect to both the enhanced sulfur removal activity and the suppressed formation of COS.

TABLE 34

Sulfur Removal Activity on Catalyst S vs. Catalyst E at 154° C., 200 psig, and 300 sccm total feed flow

| Catalyst | Procedure | Feed concentration (ppm) $H_2S$ | $SO_2$ | Conversion (%) $H_2S + SO_2$ | COS formation (ppmv) |
|---|---|---|---|---|---|
| S | D' | 8200 | 4400 | 87.4 | 170 |
| E | D' | 8550 | 4350 | 98.4 | 85 |

Example 35

A 0.5-inch o.d. 0.43-inch i.d. non-silanized stainless steel tube was capped at its bottom and a 10 ml glass liner was positioned inside the tube. This reactor was loaded with 5 cm³ of sublimated sulfur (Fischer Scientific) and 1 cm³ of alumina catalyst E. A ⅛-inch stainless steel tube was closed at its bottom and was drilled with $1/1000^{th}$ inch bits within 1 inch from its bottom to create a gas distributor. It was then adjusted to the reactor top with a reducer and a tee and was inserted to the reactor so that its bottom was positioned at about half the height of the sulfur powder and catalyst E mixture. This ⅛-inch tube was used as the feed line to the reactor, whereas the third opening of the tee (the other two being connected to the reducer and the reactor top) was connected to the outlet gas line in the same manner as the fixed-bed reactor described in Example 1. The reactor was fed with 125 sccm of $N_2$ and was heated to 140° C. and pressurized to 150 psig. The heat added to the reactor caused the sulfur powder to melt and thus form a molten sulfur bath where the catalyst particles would be suspended (due to similar density of the molten sulfur and the catalyst) and the bubbles of the $N_2$ feed gas would produce sufficient agitation so as to assume the molten sulfur bath as essentially homogenized.

10% steam (ca. 13 sccm) was fed into the reactor, followed by coal gas and $SO_2$ to achieve 8900 ppm $H_2S$ and 3800 ppm $SO_2$ in the feed, respectively, while maintaining a total flow of 125 sccm and a concentration of all other species the same as in Example 1. After reaching a pseudo steady state, the effect of varying the inlet concentration of $SO_2$ was studied by varying the $SO_2$ feed flow at constant reaction temperature and pressure. The $SO_2/N_2$ flow was increased from 20 sccm up to 27.5 sccm while keeping the coal gas and steam flows constant. The results are shown in Table 35. In agreement with the results on catalyst E in the fixed-bed reactor (Table 4), the sulfur removal activity ($H_2S+SO_2$ conversion) was maximized at an intermediate $SO_2$ concentration, implying reaction of $SO_2$ with $H_2S$ only, and not with $H_2$ or CO (them being in great excess, as noted in Example 1), at least to any appreciable rate. The formation of COS was essentially unaffected by the variation in $SO_2$ inlet concentration.

TABLE 35

Conversion of Sulfur Compounds as a Function of $SO_2$ Inlet Concentration for Molten Sulfur + Catalyst E at 140° C. and 150 psig

| Total feed flow (sccm)/$SO_2$/ $N_2$ flow (sccm) | Inlet concentration (ppm) $H_2S$ | $SO_2$ | Conversion (%) $H_2S + SO_2$ | COS formation (ppmv) |
|---|---|---|---|---|
| 128/20 | 8900 | 3800 | 72.8 | 425 |
| 132/24 | 8630 | 4420 | 79.7 | 440 |
| 133/25 | 8560 | 4570 | 80.8 | 395 |
| 134/26 | 8500 | 4720 | 80.6 | 420 |
| 135/127 | 8440 | 4860 | 79.4 | 405 |
| 135.5/27.5 | 8400 | 4940 | 77.5 | 430 |

Example 36

For the reaction system of Example 35 the effect of pressure was studied by increasing the reaction pressure from 150 psig to 300 psig in 50 psig steps, while keeping all other reaction parameters (temperature, total feed flow) and gas concentrations as in Example 35. The results are shown in Table 36.

TABLE 36

Conversion of Sulfur Compounds as a Function of Total Pressure for Molten Sulfur + Catalyst E at 140° C. and 135 sccm total feed flow

| Pressure (psig) | Conversion (%) $H_2S$ | $SO_2$ | $H_2S + SO_2$ | COS formation (ppmv) |
|---|---|---|---|---|
| 150 | 82.2 | 78.6 | 80.9 | 405 |
| 200 | 86.8 | 83.5 | 85.6 | 415 |
| 250 | 90.0 | 89.8 | 89.9 | 460 |
| 300 | 92.4 | 93.5 | 92.8 | 475 |

Obviously, additional modifications and variations of the present invention are possible in light of the above teachings. It is therefore to be understood that within the scope of the appended claims, the invention may be practiced otherwise than as specifically described herein.

What is claimed is:

1. A method for removal and recovery of elemental sulfur from a supply stream, comprising:
   contacting a supply stream containing hydrogen sulfide and at least about 20 volume % of $H_2$ and CO, with at least one oxide catalyst selected from the group consisting of alumina, silica gel and precipitated iron oxide and an oxidant in a reaction medium, at a temperature and pressure sufficient to cause oxidation of the hydrogen sulfide to produce elemental sulfur; and
   recovering at least a portion of the elemental sulfur by separation of the elemental sulfur from the reaction medium.

2. The method of claim 1, which is performed batchwise, continuously or semicontinuously.

3. The method of claim 1, wherein the reaction medium is molten sulfur.

4. The method of claim 1, which is performed in a reactor selected from the group consisting of fixed-bed reactors, moving bed reactors, fluid bed reactors and slurry bubble column reactors.

5. The method of claim 1, which is performed in a slurry bubble column reactor.

6. The method of claim 1, wherein the oxide catalyst is alumina.

7. The method of claim 6, wherein the alumina is hydrated alumina.

8. The method of claim 1, wherein the oxide catalyst is silica gel.

9. The method of claim 8, wherein the silica is silica gel that is substantially free of metallic impurities.

10. The method of claim 1, wherein the oxide catalyst is precipitated iron oxide.

11. The method of claim 1, wherein oxide catalyst has an average catalyst particle size of from 10 to 500 µm.

12. The method of claim 1, wherein the oxide catalyst has a BET surface area of from 0.1 to 2000 m$^2$/g.

13. The method of claim 1, wherein the oxide catalyst has a pore volume of from 0.06 to 1.1 cm$^3$/g.

14. The method of claim 1, which is carried out at a temperature of from 125 to 160° C.

15. The method of claim 1, wherein the process is carried out at a pressure of from atmospheric to 1200 psig.

16. The method of claim 10, wherein the process is carried out at a pressure of from atmospheric to 1200 psig.

17. The method of claim 1, wherein the oxide catalyst is pretreated by exposure to oxidant, steam or both, prior to contacting the supply stream.

18. The method of claim 1, wherein the reaction medium is molten sulfur, and wherein the elemental sulfur formed deposits on a surface of the oxide catalyst and is removed therefrom by dissolution into the reaction medium.

19. The method of claim 1, wherein the supply stream is raw syngas containing H$_2$S and the reaction medium is a slurry of molten sulfur and oxide catalyst particles, wherein the contacting step is performed by bubbling the raw syngas and about a stoichiometric amount of SO$_2$, as the oxidant, into the slurry.

20. The method of claim 1, which is carried out in a single reactor and results in removal of 99 weight % of sulfur from the supply stream.

21. The method of claim 1, which results in no more than 100 ppmv of COS production.

22. The method of claim 1, wherein the process is performed at a temperature of at least 125° C. and a pressure of up to 1200 psig.

23. The method of claim 1, wherein at least a portion of the elemental sulfur is reoxidized to sulfur dioxide and the sulfur dioxide so formed is recycled to the contacting step to be used as the oxidant.

24. The method of claim 1, wherein the supply stream and oxidant are mixed prior to contacting with the oxide catalyst and reaction medium.

25. The method of claim 1, wherein the oxidant is sulfur dioxide.

26. The method of claim 1, wherein the supply stream contains at least about 30 volume % of H$_2$ and CO.

27. The method of claim 1, wherein the supply stream contains about 30 to 90 volume % of H$_2$ and CO.

28. The method of claim 1, wherein the elemental sulfur is produced without consumption of the H$_2$ and CO.

29. A method for removal and recovery of elemental sulfur from a supply stream, comprising:
  contacting a supply stream containing hydrogen sulfide and at least about 20 volume % of H$_2$ and CO, with a catalyst consisting of at least one member selected from the group consisting of aluminum oxides, silicon oxides, titanium oxides, zirconium oxides, gallium oxides, iron oxides and activated carbon, and an oxidant, in a reaction medium, at a temperature and pressure sufficient to cause oxidation of the hydrogen sulfide to produce elemental sulfur; and
  recovering at least a portion of the elemental sulfur by separation of the elemental sulfur from the reaction medium.

30. The method of claim 29, wherein the catalyst consists of aluminum oxide.

31. The method of claim 29, wherein the catalyst consists of silicon oxide.

32. The method of claim 29, wherein the catalyst consists of titanium oxide.

33. The method of claim 29, wherein the catalyst consists of zirconium oxide.

34. The method of claim 29, wherein the catalyst consists of gallium oxide.

35. The method of claim 29, wherein the catalyst consists of iron oxide.

36. The method of claim 35, wherein the iron oxide is precipitated iron oxide.

37. The method of claim 29, wherein the catalyst consists of silica gel.

38. The method of claim 29, which is performed batchwise, continuously or semicontinuously.

39. The method of claim 29, wherein the reaction medium is molten sulfur.

40. The method of claim 29, which is performed in a reactor selected from the group consisting of fixed-bed reactors, moving bed reactors, fluid bed reactors and slurry bubble column reactors.

41. The method of claim 29, which is performed in a slurry bubble column reactor.

42. The method of claim 29, wherein the catalyst consists of alumina, silica, titania or zirconia.

43. The method of claim 29, wherein the catalyst consists of alumina or silica.

44. The method of claim 30, wherein the alumina is hydrated alumina.

45. The method of claim 29, wherein the catalyst consists of silica.

46. The method of claim 45, wherein the silica is silica gel that is substantially free of metallic impurities.

47. The method of claim 29, wherein catalyst has an average catalyst particle size of from 10 to 500 µm.

48. The method of claim 29, wherein the catalyst has a BET surface area of from 0.1 to 2000 m$^2$/g.

49. The method of claim 29, wherein the catalyst has a pore volume of from 0.06 to 1.1 cm$^3$/g.

50. The method of claim 29, which is carried out at a temperature of from 125 to 160° C.

51. The method of claim 29, wherein the process is carried out at a pressure of from atmospheric to 1200 psig.

52. The method of claim 29, wherein the process is carried out at a pressure of from atmospheric to 1200 psig.

53. The method of claim 29, wherein the catalyst is pretreated by exposure to oxidant, steam or both, prior to contacting the supply stream.

54. The method of claim 29, wherein the reaction medium is molten sulfur, and wherein the elemental sulfur formed deposits on a surface of the catalyst and is removed therefrom by dissolution into the reaction medium.

55. The method of claim 29, wherein the supply stream is raw syngas containing H$_2$S and the reaction medium is a slurry of molten sulfur and catalyst particles, wherein the contacting step is performed by bubbling the raw syngas and about a stoichiometric amount of SO$_2$, as the oxidant, into the slurry.

56. The method of claim 29, which is carried out in a single reactor and results in removal of 99 weight % of sulfur from the supply stream.

57. The method of claim 29, which results in no more than 100 ppmv of COS production.

58. The method of claim 29, wherein the process is performed at a temperature of at least 125° C. and a pressure of up to 1200 psig.

59. The method of claim 29, wherein at least a portion of the elemental sulfur is reoxidized to sulfur dioxide and the sulfur dioxide so formed is recycled to the contacting step to be used as the oxidant.

60. The method of claim 29, wherein the supply stream and oxidant are mixed prior to contacting with the catalyst and reaction medium.

61. The method of claim 29, wherein the oxidant is sulfur dioxide.

62. The method of claim 29, wherein the supply stream contains at least about 30 volume % of $H_2$ and CO.

63. The method of claim 29, wherein the supply stream contains about 30 to 90 volume % of $H_2$ and CO.

64. The method of claim 29, wherein the elemental sulfur is produced without consumption of the $H_2$ and CO.

65. A method for removal and recovery of elemental sulfur from a supply stream, comprising:

contacting a supply stream containing hydrogen sulfide and at least about 20 volume % of $H_2$ and CO, with an activated carbon or a gallium oxide and an oxidant in a reaction medium, at a temperature and pressure sufficient to cause oxidation of the hydrogen sulfide to produce elemental sulfur; and recovering at least a portion of the elemental sulfur by separation of the elemental sulfur from the reaction medium.

66. The method of claim 65, wherein the supply stream is contacted with the activated carbon.

67. The method of claim 65, wherein the supply stream is contacted with the gallium oxide.

68. The method of claim 65, which is performed batchwise, continuously or semicontinuously.

69. The method of claim 65, wherein the reaction medium is molten sulfur.

70. The method of claim 65, which is performed in a reactor selected from the group consisting of fixed-bed reactors, moving bed reactors, fluid bed reactors and slurry bubble column reactors.

71. The method of claim 65, which is performed in a slurry bubble column reactor.

72. The method of claim 65, wherein the activated carbon or gallium oxide has a particle size of from 10 to 500 μm.

73. The method of claim 65, wherein the activated carbon or gallium oxide has a BET surface area of from 0.1 to 2000 $m^2/g$.

74. The method of claim 65, wherein the activated carbon or gallium oxide has a pore volume of from 0.06 to 1.1 $cm^3/g$.

75. The method of claim 65, which is carried out at a temperature of from 125 to 160° C.

76. The method of claim 65, wherein the process is carried out at a pressure of from atmospheric to 1200 psig.

77. The method of claim 65, wherein the process is carried out at a pressure of from atmospheric to 1200 psig.

78. The method of claim 65, wherein the activated carbon or gallium oxide is pretreated by exposure to oxidant, steam or both, prior to contacting the supply stream.

79. The method of claim 65, wherein the reaction medium is molten sulfur, and wherein the elemental sulfur formed deposits on a surface of the activated carbon or gallium oxide and is removed therefrom by dissolution into the reaction medium.

80. The method of claim 65, wherein the supply stream is raw syngas containing $H_2S$ and the reaction medium is a slurry of molten sulfur and activated carbon or gallium oxide particles, wherein the contacting step is performed by bubbling the raw syngas and about a stoichiometric amount of $SO_2$, as the oxidant, into the slurry.

81. The method of claim 65, which is carried out in a single reactor and results in removal of 99 weight % of sulfur from the supply stream.

82. The method of claim 65, which results in no more than 100 ppmv of COS production.

83. The method of claim 65, wherein the process is performed at a temperature of at least 125° C. and a pressure of up to 1200 psig.

84. The method of claim 65, wherein at least a portion of the elemental sulfur is reoxidized to sulfur dioxide and the sulfur dioxide so formed is recycled to the contacting step to be used as the oxidant.

85. The method of claim 65, wherein the supply stream and oxidant are mixed prior to contacting with the activated carbon or gallium oxide and reaction medium.

86. The method of claim 65, wherein the oxidant is sulfur dioxide.

87. The method of claim 65, wherein the supply stream contains at least about 30 volume % of $H_2$ and CO.

88. The method of claim 65, wherein the supply stream contains about 30 to 90 volume % of $H_2$ and CO.

89. The method of claim 65, wherein the elemental sulfur is produced without consumption of the $H_2$ and CO.

* * * * *

UNITED STATES PATENT AND TRADEMARK OFFICE
CERTIFICATE OF CORRECTION

PATENT NO. : 6,962,683 B2 Page 1 of 1
APPLICATION NO. : 10/194221
DATED : November 8, 2005
INVENTOR(S) : Santosh K. Gangwal et al.

It is certified that error appears in the above-identified patent and that said Letters Patent is hereby corrected as shown below:

Column 4, line 38: Delete "modem" and insert -- modern --

Column 4, line 51: Delete "sec" and insert -- scc --

Column 4, line 53: Delete "sec" and insert -- scc --

Column 26, line 50: Delete "29" and insert -- 49 --

Column 28, line 13: Delete "65" and insert -- 74 --

Signed and Sealed this

Nineteenth Day of September, 2006

JON W. DUDAS
*Director of the United States Patent and Trademark Office*